(12) United States Patent
Berger et al.

(10) Patent No.: US 8,560,252 B2
(45) Date of Patent: Oct. 15, 2013

(54) COUPLING ELEMENT OF A SENSOR OF AN ULTRASONIC, FLOW MEASURING DEVICE

(75) Inventors: Andreas Berger, Hasel-Glashutten (DE); Frank Wandeler, Remingen (CH); Achim Wiest, Weil am Rhein (DE)

(73) Assignee: Endress + Hauser Flowtec AG, Reinach (CH)

( * ) Notice: Subject to any disclaimer, the term of this patent is extended or adjusted under 35 U.S.C. 154(b) by 474 days.

(21) Appl. No.: 12/950,085

(22) Filed: Nov. 19, 2010

(65) Prior Publication Data
US 2011/0118995 A1    May 19, 2011

(51) Int. Cl.
*G01F 1/00* (2006.01)
*G01D 18/00* (2006.01)

(52) U.S. Cl.
USPC ............ 702/48; 702/50; 702/54; 702/104

(58) Field of Classification Search
USPC ............. 702/48–50, 103, 104, 116, 189, 54
See application file for complete search history.

(56) References Cited

U.S. PATENT DOCUMENTS

| 6,043,924 A | 3/2000 | Montgomery |
| 6,343,511 B1 * | 2/2002 | Lynnworth et al. ............. 73/644 |
| 8,205,507 B2 * | 6/2012 | Eckert et al. ............... 73/861.26 |

FOREIGN PATENT DOCUMENTS

| DE | 10 2007 027 391 B3 | 1/2009 |
| DE | 10 2007 027 392 B3 | 1/2009 |

* cited by examiner

*Primary Examiner* — Phuong Huynh
(74) *Attorney, Agent, or Firm* — Bacon & Thomas, PLLC

(57) ABSTRACT

A coupling element of a sensor of an ultrasonic, flow measuring device, which includes at least three rods having, in each case, a first rod end and a second rod end. The rods, in each case, have, on their respective first ends, first end faces, which, in each case, can be acoustically coupled with the sound-emitting and/or sound-receiving area of an ultrasonic transducer element. The respective first end faces of the rods together form a first coupling surface of the coupling element, and the rods, in each case, have, on their respective second ends, second end faces, which form a second coupling surface of the coupling element, wherein the rods, in each case, have a first rod cross section, which is different in shape and/or size from a respective second rod cross section.

11 Claims, 2 Drawing Sheets

COUPLING ELEMENT OF A SENSOR OF AN ULTRASONIC, FLOW MEASURING DEVICE

TECHNICAL FIELD

The present invention relates to a coupling element of a sensor of an ultrasonic, flow measuring device having at least three rods for conducting an ultrasonic signal.

BACKGROUND DISCUSSION

Ultrasonic, flow measuring devices are often applied in process- and automation technology. They offer simple determination of volume flow and/or mass flow in a pipeline.

Known ultrasonic, flow measuring devices frequently work according to the Doppler principle or according to the travel time difference principle. In the case of the travel time difference principle, the different travel times of ultrasonic pulses relative to the flow direction of the liquid are evaluated. For this, ultrasonic pulses are sent at a specific angle to the tube axis, both in the direction of as well as counter to the flow. From the travel time difference, the flow velocity and therewith, in the case of a known diameter of the pipeline section, the volume flow, can be determined.

In the case of the Doppler principle, ultrasonic waves with a specific frequency are coupled into the liquid, and the ultrasonic waves reflected by the liquid are evaluated. From the frequency shift between the coupled and reflected waves, the flow velocity of the liquid can likewise be determined. Reflections in the liquid occur when small air bubbles or impurities are present in the liquid, so that this principle mainly is applied in the case of contaminated liquids.

The ultrasonic waves are produced or received with the assistance of so-called ultrasonic transducers. For this, ultrasonic transducers are firmly placed in the tube wall of the relevant pipeline section. More recently, clamp-on ultrasonic, flow measuring systems are also obtainable. In the case of these systems, the ultrasonic transducers are only pressed onto the tube wall with a clamp. A large advantage of clamp-on ultrasonic, flow measuring systems is that they do not contact the measured medium and are placed on an already existing pipeline. Such systems are, for example, known from EP 686 255 131, U.S. Pat. No. 4,484,478 or U.S. Pat. No. 4,598,593.

A further ultrasonic, flow measuring device which works according to the travel time difference principle is known from U.S. Pat. No. 5,052,230. The travel time is ascertained here by means of short, ultrasonic pulses, so-called bursts.

The ultrasonic transducers are normally composed of an electromechanical transducer element, e.g. a piezoelectric element, also called piezo for short, and a coupling layer, also called a coupling wedge or, not so frequently, a lead-in element. The coupling layer is, in such case, most often manufactured from synthetic material, and the piezoelectric element is, in industrial process measurements technology, usually made from a piezoceramic. In the piezoelectric element, the ultrasonic waves are produced and, via the coupling layer, are conveyed to the tube wall and, from there, conducted into the liquid. Since the velocities of sound in liquids and synthetic materials are different, the ultrasonic waves are refracted during the transition from one medium to the other. The angle of refraction is determined in a first approximation according to Snell's law. The angle of refraction is thus dependent on the proportion of the propagation velocities in the media.

Between the piezoelectric element and the coupling layer can be arranged another coupling layer, a so-called adapting or matching layer. The adapting or matching layer simultaneously performs, in such case, the function of transmission of the ultrasonic signal and reduction of a reflection on interfaces between two materials caused by different acoustic impedances.

As a problem in the case of the ultrasound, flow measurement is that the ultrasonic transducer, which transmits and/or receives the ultrasonic signals, is composed of different materials than the measured material or the pipeline surrounding it. Each of the materials has different acoustic and physical properties (density, velocity of sound, critical temperature, thermal expansion, maximum voltages, piezoelectric effects, . . . ). For a good thermal insulation, principally metal coupling elements, or waveguides, are applied. Such sensors have relatively good, usable bandwidths. An example of a metal coupling element can be found in EP 1 332 339 A2.

Besides individual metal rods, bundles of rods have also been known for coupling of ultrasonic signals, as, for example in U.S. Pat. Nos. 5,606,297, 4,894,806, U.S. 2007/0157404, US 2007/0297739, US 2003/0097879, U.S. Pat. Nos. 4,783,997, 4,337,843. Sensors constructed thusly seem suitable for high temperature applications. Other materials are also used in order to enable high-temperature applications of ultrasonic, flow measuring devices, as U.S. Pat. No. 4,948,552 describes. Or other forms of coupling elements, as, for example, shown in U.S. Pat. No. 6,400,648. Disadvantageous in the case of these solutions is furthermore that additional matching layers for impedance matching are necessary, or a massive signal strength loss or only a small usable bandwidth must be accepted.

In U.S. Pat. No. 6,513,391, a coupling element is described, which has a cross sectional tapering of the coupling surface of the piezoelectric element and of the coupling surface facing the measured medium. This has thermal advantages. However, an impedance matching with a "matching layer" must also be performed here.

SUMMARY OF THE INVENTION

An object of the invention is to provide a sensor of an ultrasonic, flow measuring device for high temperature applications.

The object is achieved through a coupling element of a sensor of an ultrasonic, flow measuring device, which includes at least three rods having, in each case, a first rod end and a second rod end, wherein the rods, in each case, have on their respective first ends, in each case, first end faces, which, in each case, can be acoustically coupled with the sound-emitting and/or sound-receiving area of an ultrasonic transducer element, wherein the respective first end faces of the rods together form a first coupling surface of the coupling element; and wherein the rods, in each case, have on their respective second ends second end faces, which form a second coupling surface of the coupling element; wherein the rods, in each case, have a first rod cross section, which is different in shape and/or size from a respective second rod cross section. The rods have, in such case, a predetermined length between their respective end faces on their respective ends. The respective end faces are thus essentially perpendicular on the respective rod axis.

Two surfaces are acoustically coupled especially through direct contact of the surfaces, which here would mean that the respective end faces contact the sound-emitting and/or sound-receiving area of an ultrasonic transducer element. In such case, it is, however, to be taken into consideration, that indirect contact can also constitute an acoustic coupling. If, for example, the rods are adhered with the ultrasonic transducer, some adhesive could be present not only between the individual rods, but also between the respective end faces and the sound-emitting and/or sound-receiving areas of an ultrasonic transducer element. Then, an indirect contacting would be present; however, the two surfaces would be acoustically coupled.

In a first further development of the invention, the rods are manufactured from a polymeric, metallic or ceramic material. The rods are especially manufactured from steel, stainless steel, PEEK or aluminum oxide. They have, for example, a conical shape, wherein they, for example, in each case have an approximately circularly round first and second rod cross section. A rod of the coupling element then does not have the same diameter across its entire length. In the case of a conical rod, the smaller diameter is especially to be found at its second end. The value of the acoustic impedance of the material remains the same from the first end face to the second end face of a rod of the coupling element, over its entire length. No material transition is present.

Between the rods is located in an example of an embodiment an acoustically isolating and/or heat-insulating material, e.g. air or another gas or liquid. However, other materials could also be used, especially in the region of the ends of the rods. The rods are, for example, welded, soldered or adhered onto the closure plate and/or onto the ultrasonic transducer, wherein the adhesive would then be placed between the rods. A matrix made from a solid body, extending from the first rod ends or the ultrasonic transducer to the second rod ends or the closure plate, would render the coupling element a coupling element produced from a composite material. However, due to the different velocities of sound in the different materials, a covering of the rods with a material with similar acoustic properties or with a poor conductivity of acoustic signals is sensible.

Other advantages the invention, besides the large usable temperature range, are a rapid decay time of an ultrasonic sensor with a coupling element of the invention, a good acoustic matching, a matched entry surface and a radial decoupling of transverse waves.

Another further development of the coupling element of the invention provides that each first end face is different from the respective second end face in shape and/or size. The respective end faces are then essentially perpendicular on the respective rod axis and form the respective last possible cross section through the rod.

Another further development of the solution of the invention is to be seen in the fact that the first coupling surface of the coupling element—thus the sum of all end faces of the individual rods—can be acoustically coupled with at least 25% of the sound-emitting and/or sound-receiving area the ultrasonic transducer element.

Further developed, the second coupling surface can be acoustically coupled with a first area of a closure plate, wherein the second coupling surface of the coupling element has m second end faces, wherein m is a natural number greater than or equal to three, wherein the coupling element is embodied in such a manner, that it has, changed by at least 25% with respect to a first weighted impedance ($Z_{W1}$) of the first coupling surface of the coupling element, a second weighted impedance ($Z_{W2}$), which is calculated from the sum of the products of acoustic impedances ($Z_j$) of the materials and the areas ($A_j$) of the second end faces, weighted with the surface area ($A_C$) of the first area of the closure plate:

$$Z_{W2} = \frac{1}{A_C} \sum_{j=1}^{m} Z_j A_j;$$

wherein the first weighted impedance ($Z_{W1}$) has a deviation of less than 25% of the acoustic impedance ($Z_U$) of the ultrasonic transducer, wherein the first weighted impedance ($Z_{W1}$) is calculated from the sum of the products of the acoustic impedances ($Z_i$) of the materials and the areas ($A_i$) of the first end faces, weighted with the surface area ($A_U$) of the sound-emitting and/or sound-receiving area of the ultrasonic transducer element:

$$Z_{W1} = \frac{1}{A_U} \sum_{i=1}^{n} Z_i A_i,$$

with n being a natural number larger that or equal to three. The acoustic signals are, in such case, especially conductible in the coupling element from the first coupling surface to the second coupling surface without material transition. In an example of an embodiment, the second weighted impedance ($Z_{W2}$) has a deviation of less than 25% from the acoustic impedance ($Z_A$) of the closure plate. The closure plate and/or ultrasonic transducer, especially their surfaces which the coupling element acoustically couple, are, in a form of embodiment of the invention, convex.

In an additional further development of the coupling element of the invention, the rods are arranged parallel to one another. Furthermore, in an additional further development, it is provided that the rods are embodied in such a manner, that the surface area of each first rod cross section amounts to at most 75%—especially at most 70%—of the area of the second rod cross section, and/or that the surface area of each first end face amounts to at most 75%—especially at most 70%—of the area of the second end face. If a rod of the coupling element should have differing rod cross sections, it could nevertheless have approximately equal end faces.

In an additional further development of the invention, it is provided that the rods in each case have a surface area of their respective first end faces of at most $\pi*(\lambda/10)^2$, and/or have a surface area of their respective second end faces of at most $\pi*(\lambda/12)^2$, and/or that the rods, in each case, have a length between their respective first end faces at their respective first ends and their respective second end faces at their respective second ends of at least $4*\lambda$, with $\lambda$ being the wavelength of the acoustic signal in the determined material, with $\lambda=c/f$, with c being the propagation velocity of the acoustic signal in the material and f being the frequency of the acoustic signal. Usually, acoustic signals in a range of 10 kHz to 1 GHz are used, especially in the range of 100 kHz to 10 MHz. The wavelength $\lambda$ is, in each case, calculated correspondingly. With rods made from a metal alloy with a velocity of sound of about 5000 m/s and an acoustic signal with a frequency of about 5 MHz, there results in the rods a wavelength of $1*10^{-3}$ m, and therewith, for example, the length the rods amounts to at least 4 mm, the surface area of the first end face to, at most, about 0.03 mm$^2$ and the surface area of the second end face thus amounts to, at most, about 0.02 mm$^2$.

If a rod of the coupling element has an approximately circularly round cross section across its entire length, it then has a diameter of at most $\lambda/5$ of its first end face and/or it has a diameter of its second end face of at most $\lambda/6$ at the second end and/or the rod has a length of at least $4*\lambda$ between its first end face and second end face. The rod especially can be acoustically coupled with the ultrasonic transducer element perpendicular to the sound-emitting and/or sound-receiving area of the ultrasonic transducer element.

In a further development of the coupling element of the invention, a number of rods, especially over 20, or especially 50 or 100, are combined to form a bundle. In an example of an embodiment, the number and the arrangement of the rods follow a hexagonal or cubic closest packing.

The object upon which the invention is based is furthermore achieved by a sensor of an ultrasonic, flow measuring device, which has a coupling element of the invention, which acoustically couples a sound-emitting and/or sound-receiving area of an ultrasonic transducer element with its first coupling surface.

A first further development of the sensor of the invention provides that the coupling element acoustically couples with its second coupling surface a closure plate. The thickness of the closure plate is, for example, dependent on the velocity of sound of the material of the closure plate in which the acoustic signal propagates itself, and on the frequency of the acoustic signal. The closure plate has, in such case, for example, a thickness of at most $3*\lambda/2$, especially at most $\lambda/2$. It is manufactured, for example, from a metal material, especially stainless steel, tool steel or titanium. If the closure plate is, for example, made from a metal alloy with a velocity of sound of about 5000 m/s, and the frequency of the transmitted acoustic signal amounts to e.g. MHz, the closure plate (according to $\lambda=c/f$) then has a thickness of at most 1.5 mm.

The thickness the closure plate is, in such case, measured perpendicular to the first area of the closure plate with which the rods are acoustically coupled, especially in the direction of the signal propagation of the conducted ultrasonic signal, e.g. parallel to the longitudinal axes of the rods.

A coupling element of the invention is especially made use of in a sensor of an ultrasonic, flow measuring device for conducting ultrasonic signals for flow measurement by means of a travel time difference method or of a Doppler method.

Sensors of the invention and ultrasound, flow measuring devices of the invention are produced correspondingly.

The invention will now be explained in greater detail on the basis of the appended drawing, the figures of which show as follows:

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
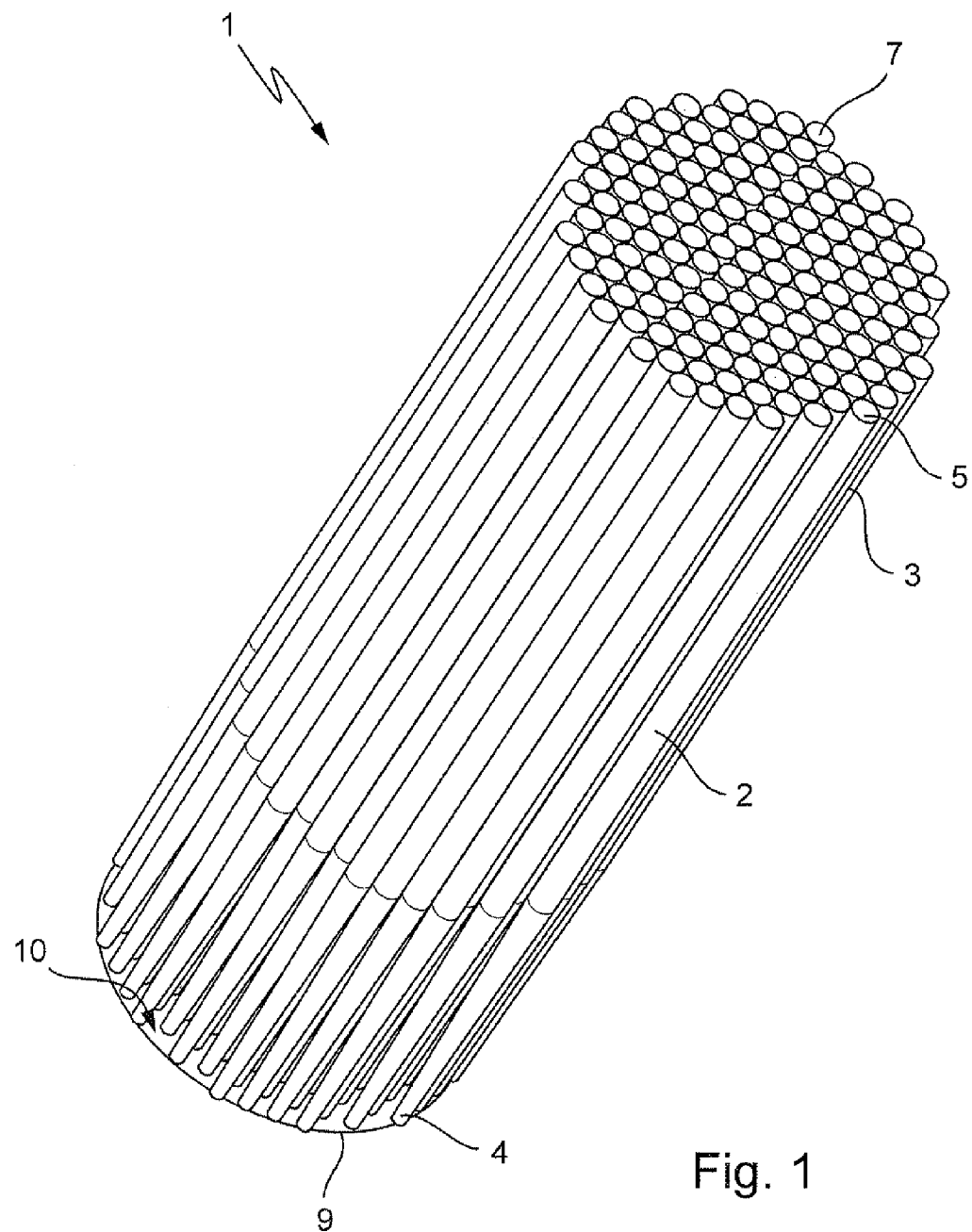
FIG. 1 shows three dimensionally, a coupling element of the invention composed of a bundle of individual rods.

FIG. 1 shows a coupling element of the invention 1 composed of a plurality of rods 2, which are combined to form a bundle. For example, in order to protect an ultrasonic transducer—e.g. a temperature sensitive piezoelectric element, which is only specified up to a temperature of 200° C. or 250° C.—of a sensor of an ultrasonic, flow measuring device against high temperatures (for example, because the sensor is applied in a hot measured medium, the flow of which is to be determined), coupling elements of the invention 1 are used.

The rods 2 of the bundle are, in this example of an embodiment, parallel to one another. Their longitudinal axes are perpendicular to a first coupling surface 7 of the coupling element 1, formed from the first end faces 5 of the individual rods 2. The second coupling surface of the coupling element 1, which is formed from the second end faces of the rods 2, is also perpendicular to the longitudinal axes of the individual rods 2. The rods 2 are relatively homogeneously bundled, i.e. so that the end faces 5 and 6 of the rods 2, which contact the first area 10 of the closure plate 9 and the sound-emitting and/or sound-receiving area of the ultrasonic transducer elements, are distributed relatively homogeneously on these respective surfaces.

The first and the second coupling surface 7 and 8 of the coupling element 1 form the last possible cross sections through the coupling element 1. Both the first area 10 of the closure plate 9, as well as the sound-emitting and/or sound-receiving area (not shown here) of the ultrasonic transducer are convex. The distances of the individual rods 2 from the edges of the respective first area 10 of the closure plate 9 or the sound-emitting and/or sound-receiving area of the ultrasonic transducer are small, and in the order of magnitude of the distances of the rods 2 from one another.

The first coupling surface 7 of the coupling element 1 contacts here at least 25% of the sound-emitting and/or sound-receiving area of the ultrasonic transducer element. The second coupling surface 8 contacts, as shown, the first area 10 of the closure plate 9. In this example, 110 rods with a diameter of the first end face 5 of 0.6 mm and a diameter of the second end face 6 of 0.34 mm are bundled to form a coupling element 1; m=n=110. From this results an area of the end faces of $A_i$=0.283 mm$^2$ and $A_j$=0.091 mm$^2$. The rods are manufactured from a steel. This steel has an acoustic impedance of $A_i$=$A_j$=46 MRayl. The ultrasonic transducer is made from a piezoceramic with an acoustic impedance of about 30 MRayl. For comparison:

Aluminum has an impedance of about 17-18 MRayl. Both the ultrasonic transducer as well as the closure plate 9 are approximately circular, and have, in each case, a surface area of 50.265 mm$^2$.

The weighted impedances are calculated as follows:

$Z_{W1}$=(110*46.2 MRayl*0.283 mm$^2$)/50.265 mm$^2$=28.6 MRayl and $Z_{W2}$=(110*46.2 MRayl*0.091 mm$^2$)/50.265 mm$^2$=9.2 MRayl.

It is clear that the difference between the two weighted impedances is greater than 25% of the first weighted impedance.

As a basis for this calculation, "Millner; Wissenspeicher Ultraschalltechnik (Ultrasonics Handbook), VEB Publisher, 1987, Chapter 1.3.5" is to be taken into consideration.

Here it is shown that $$J = \frac{1}{2}Z_0\omega^2\xi_0^2,$$

with Z0 being the acoustic impedance, ω the angular frequency, ε the deflection and the sound intensity being J, which is defined as middle sound energy, which flows through an area per time unit. In the case of constant sound intensity, it is thus true that:

$$-J = \frac{1}{2}Z_1\omega^2\xi_1^2 = \frac{1}{2}Z_2\omega^2\xi_2^2,$$

from which it follows that $Z_1\xi_1^2 = Z_2\xi_2^2$ in the case of equal angular frequency, and, ultimately, it is true that:

$$\frac{\xi_1}{\xi_2} = \sqrt{\frac{Z_2}{Z_1}}.$$

Thus, the ideal transformation ratio for these "matching layers" is determined by the impedance ratio. Acoustic transformers are in use in power ultrasonics, in ultrasonic welding. The transformation ratio amplitudes are determined roughly outside the resonances through the surfaces A:

$$\frac{\xi_1}{\xi_2} = \frac{A_2}{A_1}.$$

Figure 2:
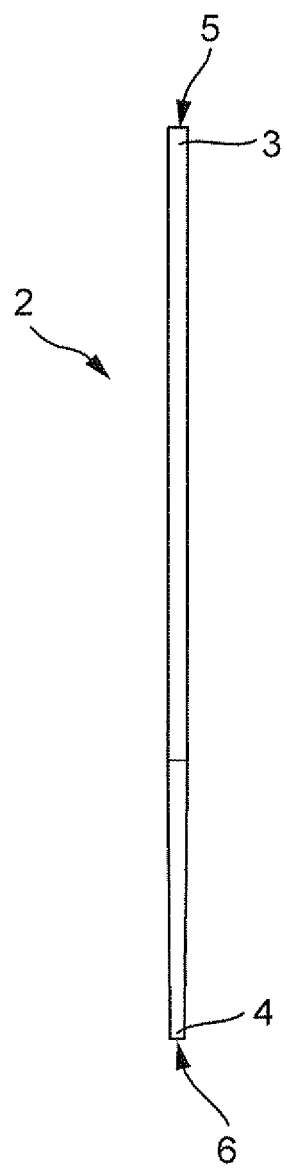
FIG. 2 shows perspectively, a rod with two differently sized cross sections.

FIG. 2 shows an individual rod 2 of a coupling element of the invention. The rod 2 includes a first end 3 and a second end 4. On the first end 3, the rod 2 has a first end face 5, and on the second end 4, a second end face 6. Together with at least two additional rods, the end faces 4, 5 form the coupling areas of the coupling element. The first end face 5 is acoustically coupled with an ultrasonic transducer, especially with its sound-emitting and/or sound-receiving area; it contacts these, for example.

The rod 2 has at its first end 3 an approximately circularly round cross section. At its second end 4, the rod 2 also has an essentially circularly round cross section. However, the size of the two cross sectional areas is different. The surface area of the first end face 5 is greater than the surface area of the second end face 6 of the rod 2, which, here, were illustrated to represent two rod cross sections. The rod 2 adopts near its second end 4 a conical shape.

The sketched rod 2 is, in this example of an embodiment, produced from a stainless steel. However, other materials, such as, for example, titanium, aluminum, and Al2O3 can also be used. The selection of the material is closely associated with the further dimensions of the coupling element, the number of rods, their lengths and/or their cross sectional areas (especially of their end faces) and the ultrasonic signal.

For example, the rods have lengths of at least 30 mm, with diameter ratios of minimum to maximum diameter of 1.3. Here, the surface area of the first end face 3 amounts to about 0.091 mm$^2$, and the surface area of the second end face 6 amounts to about 0.283 mm$^2$. Thus, the surface area of the first end face 3 amounts to about 32% of the area of the second end face 6. These geometric dimensions are also dependent on the material and especially on the wavelength of the ultrasonic signal which is to be conducted through the coupling element. If the rod cross sections, especially their diameters, are well-selected, longitudinal waves can be transmitted well and transverse waves are simultaneously strongly attenuated. This effect depends directly on the ratio of the wavelength to the rod diameter. Thus, in the case of relatively thin rods, no additional radial modes occur. The coupling element is distinguished by a rapid decay time. This is also easily explained by the similar acoustic impedance in the case of metals in comparison to the most commonly used ultrasonic elements, piezoelectric ceramics. Here, as in electrical engineering, only slight reflections take place between the two adjacent materials of the ultrasonic transducer and the coupling element.

The invention claimed is:

1. A coupling element of a sensor of an ultrasonic, flow measuring device, comprising:
at least three rods having, in each case, a first rod end and a second rod end, wherein said at least three rods, in each case, have on their respective first ends first end faces, which, in each case, can be acoustically coupled with a sound-emitting and/or sound-receiving area of an ultrasonic transducer element, wherein:
said respective first end faces of said at least three rods together form a first coupling surface of the coupling element;
said at least three rods, in each case, have on their respective second ends second end faces, which form a second coupling surface of the coupling element; and
said at least three rods, in each case, have a first rod cross section, which is different in shape and/or size from a respective second rod cross section.

2. The coupling element of a sensor of an ultrasonic, flow measuring device as claimed in claim 1, wherein:
in each case, said first end face is different in shape and/or size from said respective second end face.

3. The coupling element of a sensor of an ultrasonic, flow measuring device as claimed in claim 1, wherein:
said first coupling surface of the coupling element can be acoustically coupled with at least 25% of said sound-emitting and/or sound-receiving area of the ultrasonic transducer element.

4. The coupling element of a sensor of an ultrasonic, flow measuring device as claimed in claim 1, wherein:
said second coupling surface can be acoustically coupled with a first area of a closure plate;
said second coupling surface of the coupling element has m second end faces, wherein m is a natural number greater than or equal to three, and wherein the coupling element is embodied in such a manner, that it has, changed by at least 25% with respect to a first weighted impedance ($Z_{w1}$) of said first coupling surface of the coupling element, a second weighted impedance ($Z_{w2}$), which is calculated from sum of products of acoustic impedances ($Z_j$) of materials and areas of said second end faces, weighted with surface area ($A_c$) of the first area of said closure plate:

$$Z_{W2} = \frac{1}{A_C}\sum_{j=1}^{m} Z_j A_j,$$

wherein the first weighted impedance ($Z_{w1}$) has a deviation of less than 25% of the acoustic impedance ($Z_u$) of the ultrasonic transducer, wherein the first weighted impedance ($Z_{w1}$) is calculated from sum of products of the acoustic impedances ($Z_i$) of the materials and areas ($A_i$) of the first end faces (5), weighted with surface area ($A_u$) of the sound-emitting and/or sound-receiving area of the ultrasonic transducer elements:

$$Z_{W1} = \frac{1}{A_U}\sum_{i=1}^{n} Z_i A_i,$$

with n being a natural number greater than or equal to three.

5. The coupling element of a sensor of an ultrasonic, flow measuring device as claimed in claim 1, wherein:
 said at least three rods are arranged parallel to one another.

6. The coupling element of a sensor of an ultrasonic, flow measuring device as claimed in claim 1, wherein:
 said at least three rods are embodied in such a manner, that the surface area of said first rod cross section in each case amounts to at most 75% of the area of said second rod cross section.

7. The coupling element of a sensor of an ultrasonic, flow measuring device as claimed in claim 1, wherein:
 said at least three rods are conical.

8. The coupling element of a sensor of an ultrasonic, flow measuring device as claimed in claim 1, wherein:
 said at least three rods, in each case, have an approximately circularly round first and second rod cross section.

9. The coupling element of a sensor of an ultrasonic, flow measuring device as claimed in claim 1, wherein:
 a plurality of rods are combined to form a bundle.

10. A sensor of an ultrasonic, flow measuring device, comprises:
 a coupling element as claimed in claim 1, which acoustically couples a sound-emitting and/or sound-receiving area of an ultrasonic transducer elements with its first coupling surface.

11. The sensor of an ultrasonic, flow measuring device as claimed in claim 10, wherein:
 the coupling element acoustically couples with its second coupling surface a closure plate.

* * * * *